United States Patent [19]

Gordon

[11] Patent Number: 4,861,544
[45] Date of Patent: Aug. 29, 1989

[54] BWR CONTROL ROD

[75] Inventor: Gerald M. Gordon, Soquel, Calif.

[73] Assignee: General Electric Company, San Jose, Calif.

[21] Appl. No.: 159,972

[22] Filed: Feb. 24, 1988

[51] Int. Cl.⁴ .............................................. G21C 7/10
[52] U.S. Cl. .................................... 376/333; 376/327
[58] Field of Search ................................ 376/327, 333

[56] References Cited

U.S. PATENT DOCUMENTS

| | | | |
|---|---|---|---|
| 2,861,035 | 11/1958 | Zinn et al. | 376/327 |
| 3,407,117 | 10/1968 | Lichtenberger | 376/333 |
| 3,448,008 | 6/1969 | Hellman | 376/327 |
| 3,712,852 | 1/1973 | Fisher | 376/333 |
| 3,781,191 | 12/1973 | Jones | 376/333 |
| 4,285,769 | 8/1981 | Specker et al. | 376/327 |
| 4,400,347 | 8/1983 | Fredis et al. | 376/333 |
| 4,606,109 | 8/1986 | Weiss | 376/327 |
| 4,610,893 | 9/1986 | Eriksson et al. | 376/327 |
| 4,626,404 | 12/1986 | Chubb | 376/327 |
| 4,652,424 | 3/1987 | Andrews | 376/333 |

Primary Examiner—Harvey E. Behrend
Attorney, Agent, or Firm—Robert R. Schroeder

[57] ABSTRACT

In a control rod for a nuclear reactor having a cruciform shape with four flat planar members, an improved membrane for safeguarding against crevice cracking corrosion is disclosed. Each of the four flat planar members of the control rod is fabricated from side-by-side tubular members containing sealed neutron absorbing poisons. Each of the tubular members has square outside sections. These square outside sections are welded together to form the flat planar members of the control rod. The improvement includes a protective membrane wrapped over the structural flat planar member. The protective membrane surrounds the member and is maintained to the planar member under compression by ambient reactor pressure. The membrane provides an additional margin against crevice corrosion cracking by preventing the water of the reactor from coming into contact with the welded side-by-side square sectioned tubular members. Because the membrane is not under tension, it is not subject to either irradiation assisted stress corrosion cracking nor conventional stress corrosion cracking.

2 Claims, 2 Drawing Sheets

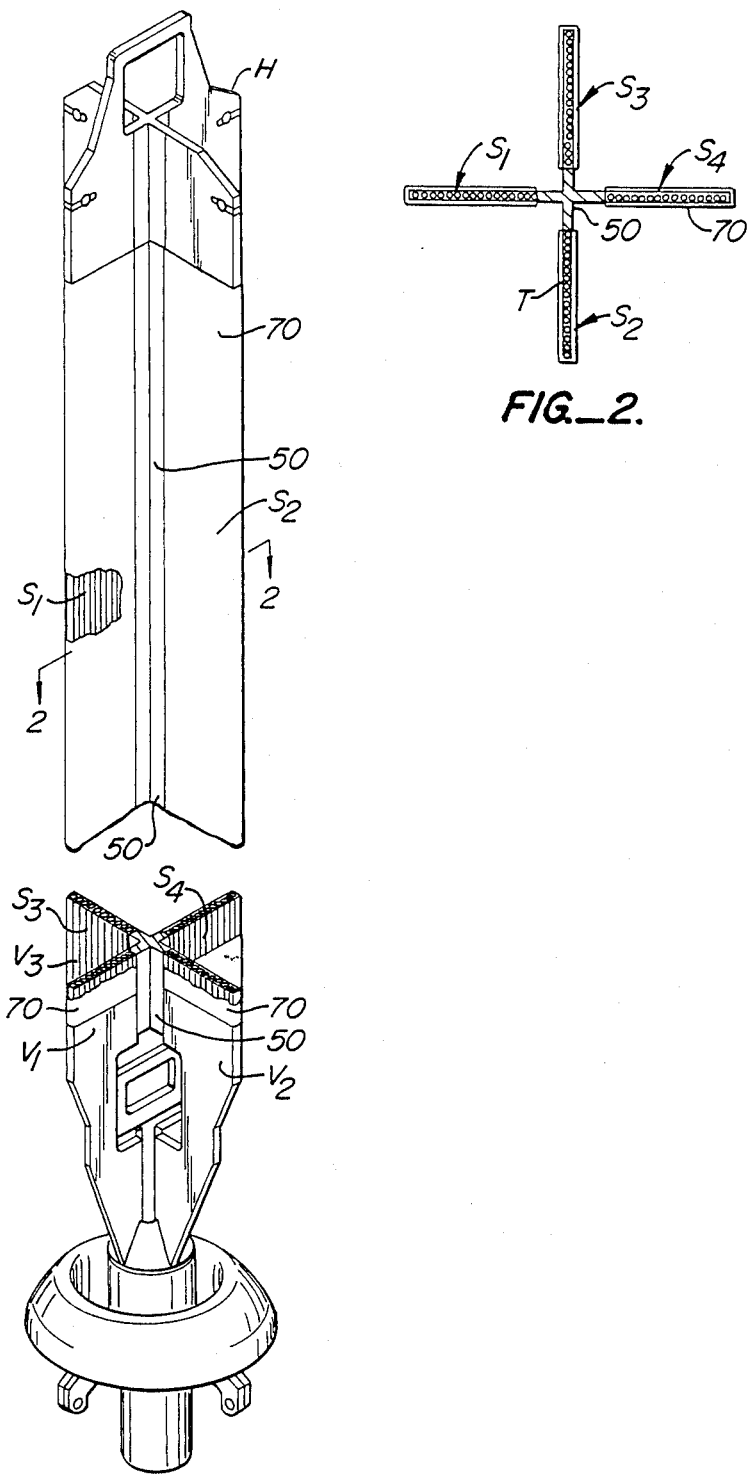
FIG._2.
FIG._1.

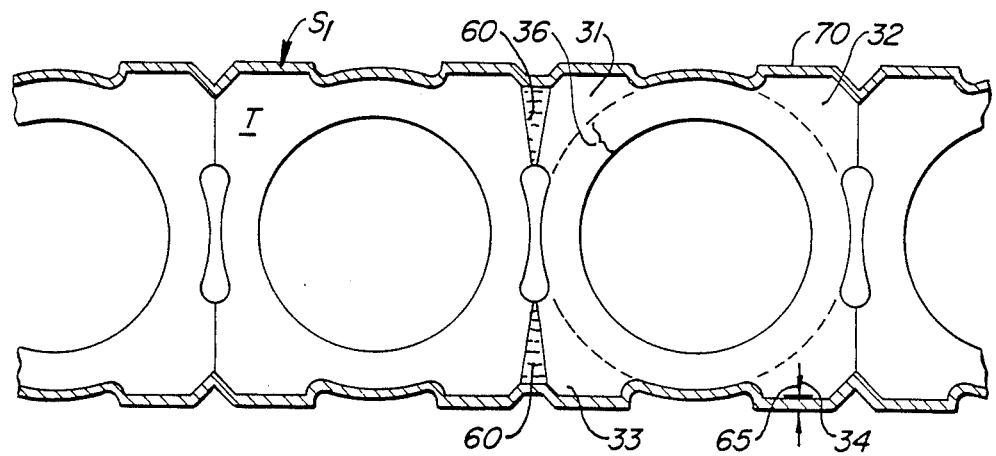
FIG._3.
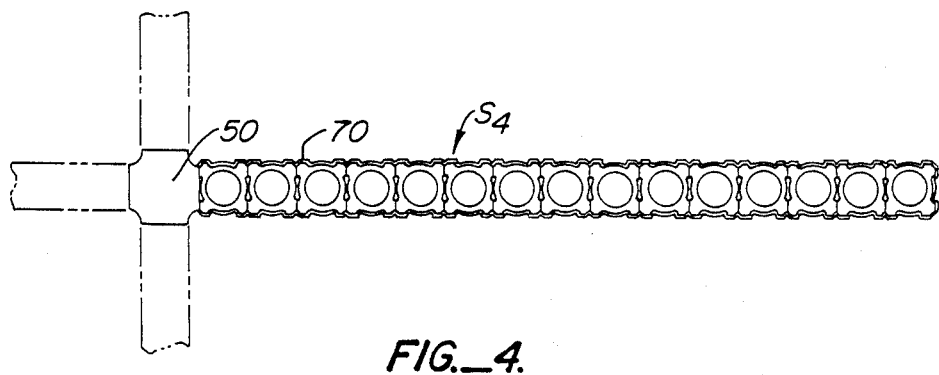
FIG._4.

BWR CONTROL ROD

This invention relates to nuclear control rods. More specifically a nuclear control rod is disclosed which is built up of composite longitudinally welded square sectioned tube members protected by a water impervious membrane.

STATEMENT OF THE PROBLEM

In nuclear reactors, elaborate precautions are taken to prevent corrosion. These precautions include most of the same anticorrosion measures taken in normal steam power plants. These measures include keeping the water in the plant in the highest possible state of purity.

The penalty for corrosion in nuclear reactors is higher than the penalty for corrosion in normal steam power plants. Not only does corrosion accomplish direct damage to the reactor and other plant components subjected to it, but the impurities resulting from the corrosion or liberated by the corrosion becomes radioactive. These radioactive impurities act as the vehicles, which vehicles are transported by the steam cycle to parts of the plant away from the site of the corrosion itself. Simply stated, corrosion is not to be tolerated to any significant degree in nuclear plants.

Despite these elaborate precautions in addition to general surface corrosion, nuclear reactors are subject to three types of corrosion resulting in cracking and potential loss of structural integrity. These classes of corrosion are stress corrosion cracking, irradiation assisted stress corrosion cracking and crevice corrosion cracking.

Members bonded together, especially welded members, are subjected to the risk of crevice corrosion cracking. In this type of cracking, water penetrates an otherwise occluded spatial interval between two bonded members. An example of a site for crevice corrosion cracking would be a weld seal between mating surfaces having a crack or pinhole allowing ingress of steam cycle water.

The water once penetrating the occlusion stagnates. It typically reacts with the metal in the occluded environment and turns acidic. Corrosion follows. Corrosion products result.

The corrosion products occupy a spatial interval larger than the occluded volume which was subject to penetration of the water in the first instance. This being the case, the corrosion products wedge the bonded members apart. This results in high local stresses and their concurrence with the aggressive local acidic environment can lead to crevical induced stress corrosion cracking.

Weld sealed members can always be candidates for crevice corrosion cracking. Assurance against crevice corrosion cracking is usually in the form of complete nondestructive testing of welds. However, where welding constitutes a major component of a made up member, nondestructive testing along may not furnish a sufficient margin of safety. Specifically, where welds are repeated in close side-by-side relation, an additional margin of safety to prevent crevice corrosion cracking may be required.

It has been proposed to construct control rods of tubes having square cross section exteriors. The square cross section exteriors of the tubular members are bonded together by numerous continuous welds all along the longitudinal length of the control rods. Laser automated welds are proposed. See Dixon et al. U.S. patent application Ser. No. 031,633 filed Mar. 30, 1987 entitled Control Rod.

SUMMARY OF THE PRIOR ART

It is known to construct control rods from flat pieces of stainless steel. These pieces of stainless steel extend in the plane of the control rods and include carefully accurately drilled side-by-side holes. These holes are commonly drilled with so called "gun drills."

Once the side-by-side holes are drilled, the holes are filled with nuclear poisons. Once filled, the holes are sealed, typically by force fitted and welded stainless steel plugs. These poisons, such as boron carbide, absorb slow neutrons.

Unfortunately, such control rods have been known to crack under the pressure generated by the atomic decay of the confined neutron absorbing poisons. Moreover, the stresses created by the pressurized neutron absorbing poisons, render such control rods susceptible to both irradation assisted stress corrosion cracking as well as regular stress corrosion cracking.

It is also known to enclose control rods in protective structural sheaths. See Specker U.S. Pat. No. 4,285,769.

In the Specker control rod construction, neutron absorbing poisons are contained within cylindrical tubes having cylindrical cross sections with cylindrical exteriors. The tubes are contained within sheaths. The sheaths containing the tubes serve two distinct purposes.

First, the sheaths are structural. That is to say under tension and compression the sheaths extend from the top of the control rod to the bottom of the control rod enclosing the side-by-side tubes and holding the tubes together. The side-by-side tubes are not otherwise joined, one to another. That is to say each discrete sheath keeps the tubes containing the neutron absorbing poisons in the configuration of a flat planar member.

Secondly, the sheaths permit water to penetrate immediately to the control rods. This water penetration occurs inside the sheath and immediately around the tubes containing the neutron absorbing poisons. The water penetration permits additional neutron moderation of neutrons outside of the poison containing tubes of the control rods. This additional moderation leads to improved neutron capture within the individual poison containing tubes.

Because the sheath does not preclude water penetration, the enclosed poison containing tubes can be subject to crevice corrosion cracking, stress corrosion cracking and irradiation assisted stress corrosion cracking. Further, because the sheaths are structural and are subject to both tension and compression, these sheaths can be sites for crevice corrosion cracking in occluded areas such as around spot welds between the sheath and control rod structure.

SUMMARY OF THE INVENTION

In a control rod for a nuclear reactor having a cruciform shape with four flat planar members, an improved membrane for safeguarding against crevice cracking corrosion is disclosed. Each of the four flat planar members of the control rod is preferably fabricated from side-by-side tubular members containing sealed neutron absorbing poisons. Each of the tubular members has square outside sections. These square outside sections are welded together to form the flat planar members of the control rod. The improvement includes a protective membrane wrapped over the structural flat planar member. The protective membrane surrounds the member and is maintained to the planar member under compression by ambient reactor pressure. The membrane provides an additional margin against crevice corrosion cracking by preventing the water of the reactor from coming into contact with the welded side-by-side square sectioned tubular members. Because the membrane is not under tension, it is not subject to either irradiation assisted stress corrosion cracking nor conventional stress corrosion cracking.

OTHER OBJECTS, FEATURES AND ADVANTAGES

An object of this invention is to disclose protective sheaths around a structurally integral control rod for the purpose of providing margin against crevice corrosion cracking. Accordingly, the improved control rod is constructed by welding in side-by-side relation the square exterior profile of otherwise cylindrical tubes containing neutron absorbing poisons. These welded side-by-side square exterior tubes form the flat planar member which can be one of the typical four sides of the cruciform shaped control rod. A light stainless steel membrane in the order of 0.005 to 0.015 thickness is wrapped over the exterior of the control rod. This membrane is welded in water tight relation between the rod handle, the rod tip and the rod shaft to completely enclose the constructed flat planar member of the control rod. Entry of water into the welded interstices between the square sectioned tubes is prevented by the welds.

An advantage of the membrane is that once the control rod is placed within the reactor, the ambient pressure of the reactor resulting from the heated water coolant compresses the membrane tightly to and on the rods. This compression holds the membrane in firm and intimate engagement to the sides of the control rod under compression.

A further advantage of the membrane is that since it is under compression, the membrane cannot be subject to either irradiation stress corrosion cracking nor conventional stress corrosion cracking. In short, the disclosed membrane while providing margin against crevice corrosion cracking is itself not subject to the remaining forms of corrosion cracking common to nuclear reactors.

It is a further object of this invention to disclose a technique for confining control rod leakage and contamination from control rods formed from flat pieces of stainless steel containing a plurality of side-by-side horizontally drilled holes. According to this aspect of the invention, such control rods are wrapped with a continuous membrane in accordance with the teachings of this invention. The membrane is loosely wrapped so that no part of the membrane comes under tension. When the membrane wrapped control rod is placed within a reactor under operating pressure, the entire membrane comes under compression, and is not subject to the stress cracking heretofore set forth. This being the case, contaminates from cracking of the control rods are confined by the membrane and prevented from being vehicles for contamination of the controlled nuclear reactor.

BRIEF DESCRIPTION OF THE DRAWINGS

Other objects, features and advantages of this invention will become more apparent after referring to the following specification and attached drawings in which;

FIG. 1 is an upstanding isometric view of a control rod fabricated in accordance with the teachings of this invention;

FIG. 2 is a section of the control rod of FIG. 1 taken along lines 2—2;

FIG. 3 is an expanded view of planar member S1 illustrating the sheath placed over the control rod; and FIG. 4 illustrates the planar member S4, the member S4 being completely surrounded by the sheath in accordance with this invention.

Referring to FIG. 1, a control rod is illustrated. Typically, the control rod fits between the corners of four adjacent fuel bundles, these fuel bundles not being shown. The control rod is cruciform (or cross shaped) in section. Being cruciformed or cross shaped in section, the control rod includes flat planar members S1, S2, S3, and S4 formed from a single cross shape member 50. The cross shaped members are formed from side-by-side cylindrical tubes T each having a square exterior cross section. This construction can be best illustrated with respect to FIG. 3.

Referring to FIG. 3, the square cross section tubes of the improved tubes T of the control rod are illustrated. Specifically, each tube includes a constant thickness cylindrical section 36. To this constant thickness cylindrical section 36 there are added four corner members. These corner members are corners 31, 32, 33, and 34. It is these corner members which impart to the exterior of the tubes a square profile.

Tube 36 is recessed from the outside diameter of the corner members. For example, it can be seen that tube 36 is recessed by a distance 65 between a straight line drawn between corner members 31 and corner member 34. Likewise there is a similar recess between corner member 32 and corner member 33.

The tubes are structurally joined together. They are structurally joined by weldment 60. Typically, weldment 60 comes from a laser type weld.

In can be seen that the tubes once welded in side-by-side relation form a structurally integral member.

Unfortunately and referring back to FIG. 1, it can be seen that the control rod itself when fabricated by this procedure includes many side-by-side longitudinal welds. The welds are on opposite sides of the planar member S1 through S4 and extend the full length of such members. While it is anticipated that such welds can be nondestructively tested for their integrity, the cumulative length of such welds can present the possibility of sites for crevice corrosion cracking.

Referring to all figures, especially FIG. 1, a membrane 70 is placed immediately over the exterior of the members S1, S2, S3, and S4. Membrane 70 is joined to cross shaped member 50 along the center of the control rod. The membrane joins to velocity limiter sections V1-V4 at the bottom end and to the handle H at the top end.

The membrane 70 is preferably 0.005 to 0.015 thick, constructed of stainless steel suitable for the reactor environment, and preferably wrapped loosely over the outside of the planar members S1-S4. This loose wrapping occurs so that when the control rod is subjected to the pressure of a reactor, no part of the membrane comes under tensive forces.

The membrane is not structural. It has no part in maintaining the square exterior sectioned tubes containing the neutron absorbing poisons together in side-by-side relation.

The membrane is only required to have four separate properties.

First, the membrane must be water proof. That is to say it must prevent the water in the reactor from seeing the outside of the weldment 60 between the square sectioned tubes.

Second, the membrane must be conformable under compression when placed in the reactor. Ths conformation under pressure will bring the membrane into intimate contact with the outside surface of the control rod. That is to say, it will cover surfaces S1, S2, S3 and S4 and be impressed upon these members by the pressure within the reactor.

Third, the membrane must be under compression only. This compression only feature must exist exterior of a reactor as well as interior of a reactor.

The compression of the membrane has a feature not immediately apparent. Specifically, both irradiated assisted stress corrosion cracking and conventional stress corrosion cracking require, among other things, tension. By placement of a membrane over the control rod members and allowing the pressure within the reactor to compress the membrane onto the control rod members, compression—and not tension—is generated. In the compressive environment neither stress corrosion cracking nor irradiated assisted stress corrosion cracking occurs.

Finally, the sheath must have sufficient thickness to resist puncture from normally anticipated abrading. We propose that a 5,000ths to 15,0000ths inch membrane will be sufficient for the purposes herein disclosed.

The reader will understand that we have heretofore set forth in the preferred embodiment of this invention the welded side-by-side control rod construction illustrated. The reader will as well understand that the disclosed technique is also applicable to constructions wherein a flat stainless steel plate is used for the flat planar surface of the control rod and side-by-side gun drilled holes are utilized to contain the neutron absorbing nuclear poisons. These holes when plugged to seal the poisons—such as boron carbide interior thereof—are subjected to high pressures due to atomic decomposition of their poisons upon the absorption of neutrons. These pressures cause cracking.

The membrane utilized herein can as well be utilized for the tertiary sealing of such control rod surfaces. By the expedient of utilizing a membrane with a loose wrap—allowing the pressue of the operating reactor to place the membrane under compression, a secondary seal against control rod cracking is present. This seal acts in precisely the same manner as set forth herein.

I claim:

1. An improvement to an elongate flat planar member comprising a portion of a nuclear reactor control rod for insertion within the core of a nuclear reactor for control of the reaction, said planar members of said control rod comprising in combination:

a plurality of tubes defining cylindrical volumes and having square cross sections exteriors, each said tube defining a cylinder of constant sidewall thickness sufficient for defining therewithin a cylindrical volume for containment of neutron absorbing poisons; corner sections integrally formed to said constant sidewall thickness cylinder having a placement on the outside of said cylinder at 90 intervals to the sidewalls of said constant sidewall thickness tube, said four corner sections defining volumes of increased thickness neutron absorbing poisons confined within each of said cylindrical volumes in said tube of constant sidewall thickness; said tubes joined in side-by-side relation by welding at said corner sections to form said elongate flat planar member of said control rod, the improvement comprising a flexible sheath fastened around said flat planar member, said sheath not fastened under tension, said sheath fastened at the extremities thereof to said control rod to enclose said welded side-by-side square exterior sectioned tubes in water tight relation.

2. A control rod for a nuclear reactor including at least one elongate flat planar member; a plurality of tubes defining cylindrical volumes having square exterior cross sections, each said tube defining a cylinder of constant sidewall thickness sufficient for defining therewithin a cylindrical volume for the containment of neutron absorbing poisons; corner sections placed on each tube and integrally formed to each tube at said constant sidewall thickness cylinder and having placement on the outside of said cylinder at 90° intervals to the sidewalls of said constant sidewall thickness tube, said corner sections defining volumes of increased thickness in said tube of constant sidewall thickness; a plurality of said tubes welded at said corner sections in side-by-side juxtaposed relation to form said elongate flat planar member of said control rod neutron absorbing poisons confined within each of said cylindrical volumes;

a sheath, said sheath wrapped around said planar member of said control rod said sheath not wrapped around said planar member under tension, said sheath welded in water tight relation at its extremities to prevent penetration of water to the welds between said tubes whereby a margin of safety can be provided to crevice corrosion cracking; and, said control rod and said sheath subjected to operating pressure in a nuclear reactor whereby said sheath is impressed on said control rod under tension only.

* * * * *